Nov. 18, 1958    F. C. ROBINSON ET AL    2,861,231
ELECTRICAL CAPACITORS
Filed July 30, 1954

INVENTORS
Frederick Chetham Robinson
And Richard Alfred Groves
BY Watson, Cole, Grindle & Watson
ATTORNEYS

United States Patent Office 2,861,231
Patented Nov. 18, 1958

2,861,231

ELECTRICAL CAPACITORS

Frederick Chetham Robinson and Richard Alfred Grouse, Wandsworth, London, England, assignors to A. H. Hunt (Capacitors) Limited, London, England, a British company Application July 30, 1954, Serial No. 446,824

Claims priority, application Great Britain July 31, 1953

6 Claims. (Cl. 317—260)

This invention comprises improvements in or relating to the manufacture of electrical capacitors.

The invention is an improvement in or modification of that described in British patent specification No. 647,573. In that specification there is described a capacitor having for its essential operating portion a strip of metallised paper whereof the metallised surface is subdivided by a continuous non-metallised portion extending in a devious course along the strip between separate metallised areas so as to form a repeated pattern in which some metallised areas extend across the strip from one edge and some from the other, the strip being wound into a roll so that in the roll different metallised areas overlap one another, the areas extending from one edge being connected to one pole of the capacitor and those extending from the other edge being connected to the other pole of the capacitor.

The advantage of the use of a dielectric strip of the kind referred to is that a wound roll capacitor can be produced from a single strip instead of requiring a plurality of strips to be wound together into a roll, with all the problems of mutual registration and complication of winding apparatus which this involves.

According to British patent specification No. 680,472 which is for a British patent of addition to Patent No. 647,573 other dielectrics than paper may be employed such as polythene strip, in capacitors of this kind.

According to the present invention, in a capacitor of the kind described, the dielectric strip is metallised on both faces and the continuous non-metallised portion which subdivides the metallised surfaces is given such a form on both faces that when the capaictor is wound from the strip, metallised areas only of the same polarity, come in contact with one another.

Figure 1:
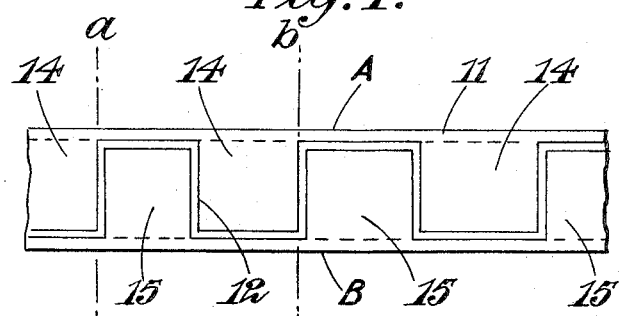
Figure 2:
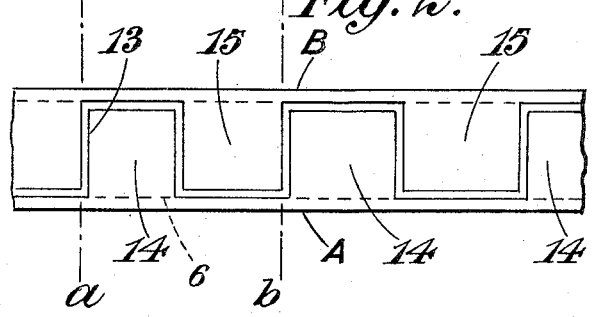
Figure 3:
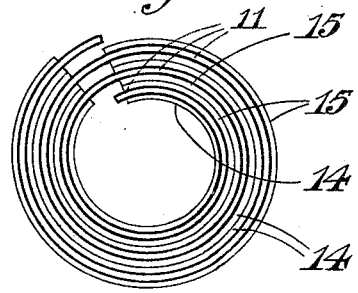

One form of construction in accordance with the invention will now be described by way of example and with reference to the accompanying diagrammatic drawings in which:

Figures 1 and 2 show opposite sides of a dielectric strip from which a capacitor is to be wound, and, Figure 3 is an end-on view of the wound capacitor roll.

Referring firstly to Figures 1 and 2, a dielectric strip 11, metallised on both faces, has been demetallised by the known technique of electrical demetallisation over a part of the area of each face, along narrow bands 12, 13 each of which forms a key-pattern of gradually increasing pitch upon its respective face. The pitch a—b of the key-pattern is equal to the sum of the circumferences of two consecutive turns of the roll into which the strip is intended to be wound, the increasing pitch being arranged to compensate for the increase in circumference as the diameter of the roll increases. The key-pattern on one face is out of phase with the key-pattern on the opposite face. That is to say, the metallised areas 14 which are left on the one face extend to one of the edges of the strip, designated the A-edge, while the metallised areas 15 on the other face which lie opposite to the areas 14 extend up to the opposite edge, designated the B-edge. Metallised areas 14, 15 extending to edges A, B respectively, alternate on both faces.

It will be found that when the strip is wound into a roll (Figure 3) the A-edge areas 14 of the one face come in contact with the A-edge areas 14 of the other face of the strip 11 and likewise the B-edge areas 15 of one face come in contact with the B-edge areas of the other face of the strip. The effect is that a capacitor is produced having dielectric metallised on both faces which can be wound satisfactorily into a roll from a single strip of dielectric. In the example described, there is only one electrode of the same polarity to each turn of the roll, but if desired higher odd numbers of homopolar electrodes may be provided in each turn. Terminal connections may be made by spraying or otherwise bonding metal onto the ends of the roll and attaching terminals thereto by soldering or the like.

The advantage of being able to use dielectric metallised on both faces is that the capacity of the unit can be more accurately predetermined beforehand, and does not depend upon the tightness with which the roll is wound and cannot be altered by variation of external pressure upon the roll.

Furthermore, when this method is applied to plastic film dielectrics, additional benefits result from the avoidance of air space between the metal surfaces that form opposite poles of the capacitor, which would result in ionization taking place in such air space under certain conditions of use and tend toward early breakdown and a high power factor.

The preferred dielectric for such a purpose is a plastic material made from polyethylene terephthalate and marketed under the trade names of "Melinex" and "Mylar." Alternatively, any plastic film material having suitable properties, such as polythene, may be employed.

We claim:

1. An electrical capacitor roll wound from a single strip of dielectric material metallised on both faces wherein each metallised surface is subdivided into two electrode areas by a continuous non-metallised portion, each said portion being given such a form that electrode areas of one polarity on one side of the strip are positioned opposite electrode areas of the opposite polarity on the other side of the strip so that on winding the capacitor only metallised areas of the same polarity come into contact with one another.

2. A capacitor as claimed in claim 1 wherein each metallised area on one face extends up to one edge of the dielectric strip and the metallised area opposite it on the other face of the strip extends up to the opposite edge.

3. A capacitor as claimed in claim 1, wherein the pattern formed by each demetallised portion is a square key pattern providing on the respective face of the strip a plurality of metallised areas extending to one edge of the strip alternated with metallised areas extending to the opposite edge, the whole being wound into a roll in which in each complete turn of the roll there is an odd number of areas on each face of the strip.

4. A capacitor as claimed in claim 1, wherein the dielectric is a synthetic plastic material.

5. A capacitor as claimed in claim 4 wherein the dielectric is of polyethylene terephthalate.

6. An electrical capacitor roll suitable for use in capacitors of small size and low capacity, comprising a convolutely wound elongated thin narrow web of dielectric material having upon each of its two surfaces a longitudinally-extending series of extremely thin low resistance metallic film electrodes forming a repeated pattern, some of the electrodes in each series being of one polarity and extending inwardly from one edge of the web and others being of the opposite polarity and extending inwardly from the opposite edge of the web with those electrodes of the series which terminate at one edge of the web being electrically insulated by a nonmetallised area of the web from the electrodes terminating at the opposite edge, each electrode of the series of electrodes on one surface of the web being opposite an electrode on the other surface that is of opposite polarity and extends up to the opposite edge of the web, a terminal at one end of the roll electrically connected to the electrodes extending up to the edge of the web at that end and another terminal at the other end of the roll likewise electrically connected to the electrodes extending up to the edge of the web at the other end, and wherein in each succeeding turn of the roll each electrode of one polarity overlies an electrode of opposite polarity on said same surface of the web in the preceding turn of the roll and is contiguous with an electrode of the same polarity on the opposite surface of the web.

References Cited in the file of this patent

UNITED STATES PATENTS 2,637,766     Grouse _____ May 5, 1953

FOREIGN PATENTS 453,939     Great Britain _____ Sept. 21, 1936
666,731     Great Britain _____ Feb. 20, 1952

OTHER REFERENCES

"Polyethylene Terephthalate as a Capacitor Dielectric," by M. C. Wooley et al., Electrical Engineering, August 1952, pp. 715–717.